United States Patent
Marchek et al.

(10) Patent No.: US 10,802,239 B2
(45) Date of Patent: Oct. 13, 2020

(54) OPTICAL FIBER TRUNK CABLE BREAKOUT CANISTERS AND ASSEMBLIES

(71) Applicant: AFL Telecommunications LLC, Duncan, SC (US)

(72) Inventors: Kyle Marchek, Greer, SC (US); Tom Sawyer, Greenville, SC (US)

(73) Assignee: AFL Telecommunications LLC, Duncan, SC (US)

( * ) Notice: Subject to any disclaimer, the term of this patent is extended or adjusted under 35 U.S.C. 154(b) by 565 days.

(21) Appl. No.: 15/204,035

(22) Filed: Jul. 7, 2016

(65) Prior Publication Data

US 2018/0011276 A1    Jan. 11, 2018

(51) Int. Cl.
*G02B 6/44* (2006.01)

(52) U.S. Cl.
CPC .......... *G02B 6/4472* (2013.01); *G02B 6/4416* (2013.01)

(58) Field of Classification Search
CPC ....................................................... G02B 6/44
USPC ....................................................... 385/134
See application file for complete search history.

(56) References Cited

U.S. PATENT DOCUMENTS

| | | | | |
|---|---|---|---|---|
| 4,046,453 A * | 9/1977 | Fiebelkorn | ........... | G02B 6/3834 385/59 |
| 4,457,574 A * | 7/1984 | Walters | .............. | H01R 13/6588 439/607.41 |
| 4,798,441 A * | 1/1989 | Clark | .................... | G02B 6/4292 385/88 |
| 5,042,901 A * | 8/1991 | Merriken | ............. | G02B 6/3816 385/135 |
| 6,028,974 A * | 2/2000 | Shyu | ..................... | G02B 6/4428 385/100 |
| 7,093,985 B2 * | 8/2006 | Lord | .................... | G02B 6/4201 385/88 |
| 8,737,786 B1 * | 5/2014 | Compton | ............. | G02B 6/4472 385/100 |
| 2001/0046354 A1 * | 11/2001 | Nguyen | ............... | G02B 6/3849 385/53 |
| 2005/0111811 A1 * | 5/2005 | Cooke | .................. | G02B 6/4455 385/136 |
| 2007/0003195 A1 * | 1/2007 | Ice | ....................... | G02B 6/4201 385/92 |
| 2007/0036487 A1 * | 2/2007 | Grzegorzewska | ... | G02B 6/3816 385/53 |
| 2009/0060421 A1 * | 3/2009 | Parikh | .................. | G02B 6/4444 385/71 |
| 2014/0029900 A1 * | 1/2014 | Logan, Jr. | ............ | G02B 6/4281 385/92 |
| 2015/0260936 A1 * | 9/2015 | Newbury | ............. | G02B 6/4471 385/135 |

(Continued)

*Primary Examiner* — Kaveh C Kianni
(74) *Attorney, Agent, or Firm* — Dority & Manning, P.A.

(57) ABSTRACT

An optical fiber trunk cable breakout canister includes a main canister body, the main canister body extending between a first end opening and a second end opening and including a first end portion defining the first end opening and a second end portion defining the second end opening. The first end opening has a maximum width that is less than a maximum width of the second end opening. The breakout canister further includes a plate disposed within the second end portion. The breakout canister further includes a potting material disposed within the second end portion. The breakout canister further includes a retainer washer disposed within the main canister body.

20 Claims, 8 Drawing Sheets

(56) References Cited

U.S. PATENT DOCUMENTS

| | | | |
|---|---|---|---|
| 2015/0346451 A1* | 12/2015 | Islam | H02G 15/1055 |
| | | | 174/50.52 |
| 2015/0355429 A1* | 12/2015 | Villegas | G02B 6/4472 |
| | | | 385/101 |
| 2016/0018603 A1* | 1/2016 | Mooij | G02B 6/3817 |
| | | | 385/76 |
| 2016/0209615 A1* | 7/2016 | Bakatsias | G02B 6/4472 |

* cited by examiner

OPTICAL FIBER TRUNK CABLE BREAKOUT CANISTERS AND ASSEMBLIES

FIELD OF THE INVENTION

The present disclosure relates generally to optical fiber trunk cables, and more particularly to breakout canisters which facilitate the breakout of individual optical fiber or power cables of optical fiber trunk cables.

BACKGROUND OF THE INVENTION

The ability of high-quality optical fibers to transmit large amounts of information without appreciable signal degradation is well known. As a result, optical fibers have found widespread use in many applications, such as voice and data transmission. For example, optical fibers are often fed up tower (or to rooftops) to remote radio units (RRUs) located at the top of the towers or rooftops. In this regard, FIGS. 1 and 2 illustrate a hybrid power/data trunk cable, also referred to as an optical fiber trunk cable that can be used for this purpose. As shown, the trunk cable is fed in this example from a baseband unit (BBU) to multiple RRUs located, e.g., on top of a tower. A breakout canister, which may be located near the top of the tower or rooftop, is used to separate the various sub-units of the trunk cable, which may include optical fibers and/or power conductors, needed for each of the RRUs.

Different styles of breakout canisters are known. Examples of breakout canisters include two-piece screw canisters and three-piece c-clip canisters. The two-piece screw canister design uses a heat shrink material to seal protruding cable from the nozzle area. Entry of water into the canister is an issue if the heat shrink is not sealed properly around the nozzle and cable jacket. In addition, the heat shrink material is relatively expensive, raising overall costs. In known three-piece c-clip canisters, the area where the fiber cable exits the nozzle is sealed with epoxy or heat shrink material and the bottom location where the main trunk cable enters the canister is sealed with epoxy or heat shrink. Such designs suffer from similar concerns with regard to water entry and expense.

Accordingly, improved breakout canisters for optical fiber trunk cables are desired. In particular, breakout canisters which provide improved water resistance, reduced cost and/or improved durability would be advantageous.

BRIEF DESCRIPTION OF THE INVENTION

Aspects and advantages of the invention will be set forth in part in the following description, or may be obvious from the description, or may be learned through practice of the invention.

In accordance with one embodiment, an optical fiber trunk cable breakout canister is provided. The breakout canister includes a main canister body, the main canister body extending between a first end opening and a second end opening and including a first end portion defining the first end opening and a second end portion defining the second end opening. The first end opening has a maximum width that is less than a maximum width of the second end opening. The breakout canister further includes a plate disposed within the second end portion. The breakout canister further includes a potting material disposed within the second end portion. The breakout canister further includes a retainer washer disposed within the main canister body.

In accordance with another embodiment, an optical fiber trunk cable breakout assembly is provided. The assembly includes a trunk cable, the trunk cable comprising an outer jacket and a plurality of subunits extending from the outer jacket. The assembly further includes a breakout canister. The breakout canister includes a main canister body, the main canister body extending between a first end opening and a second end opening and including a first end portion defining the first end opening and a second end portion defining the second end opening. The first end opening has a maximum width that is less than a maximum width of the second end opening. The jacket extends through the first end opening and each of the plurality of subunits extends through the second end opening. The breakout canister further includes a plate disposed within the second end portion. Each of the plurality of subunits extends through the plate. The breakout canister further includes a potting material disposed within the second end portion, the potting material surrounding a portion of each of the plurality of subunits. The breakout canister further includes a retainer washer disposed within the main canister body, the retainer washer surrounding and engaging the jacket.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
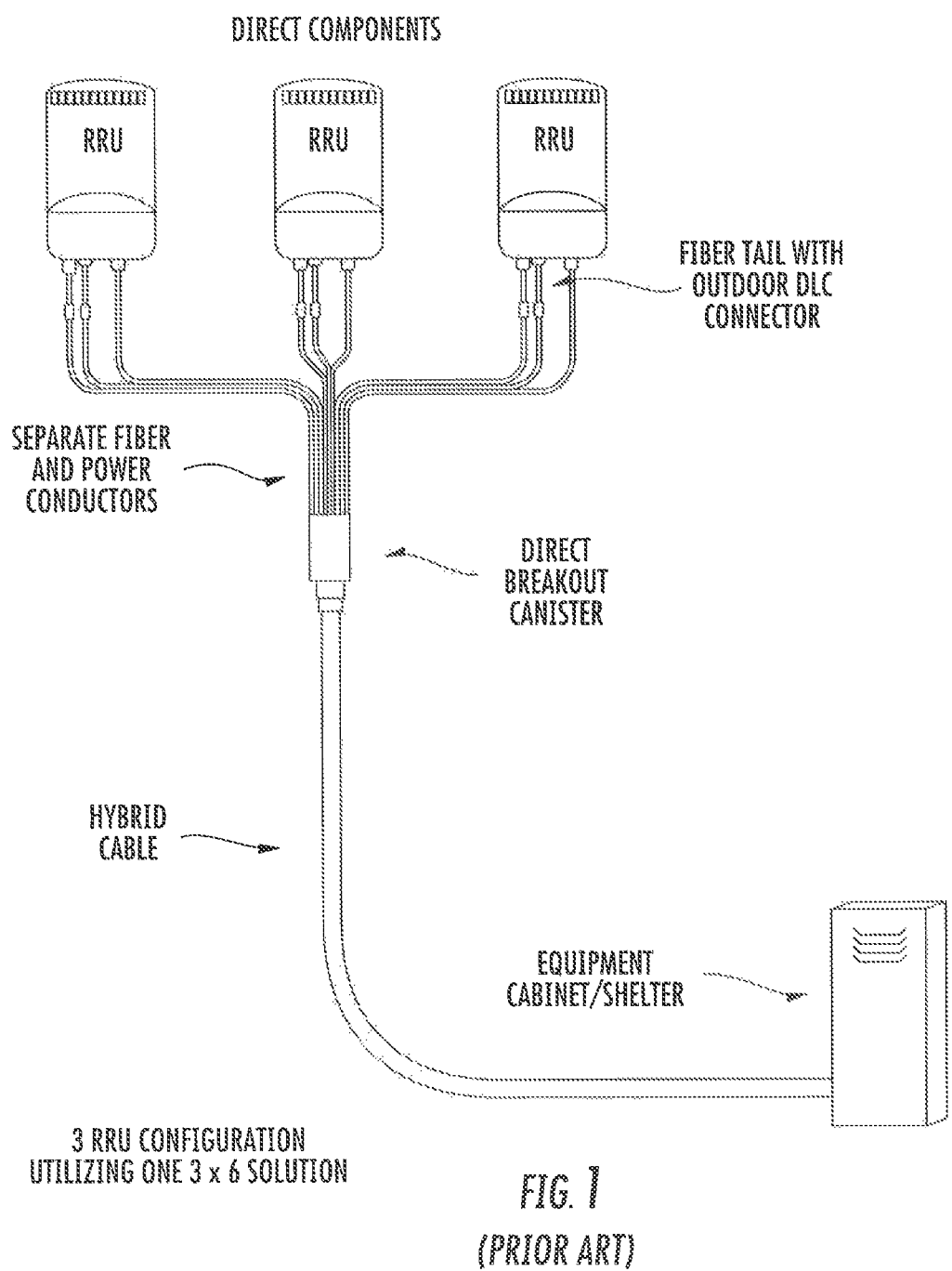
FIG. 1 is a diagrammatic representation showing a trunk cable being broken out into three RRUs using a breakout canister of the prior art.
Figure 2:
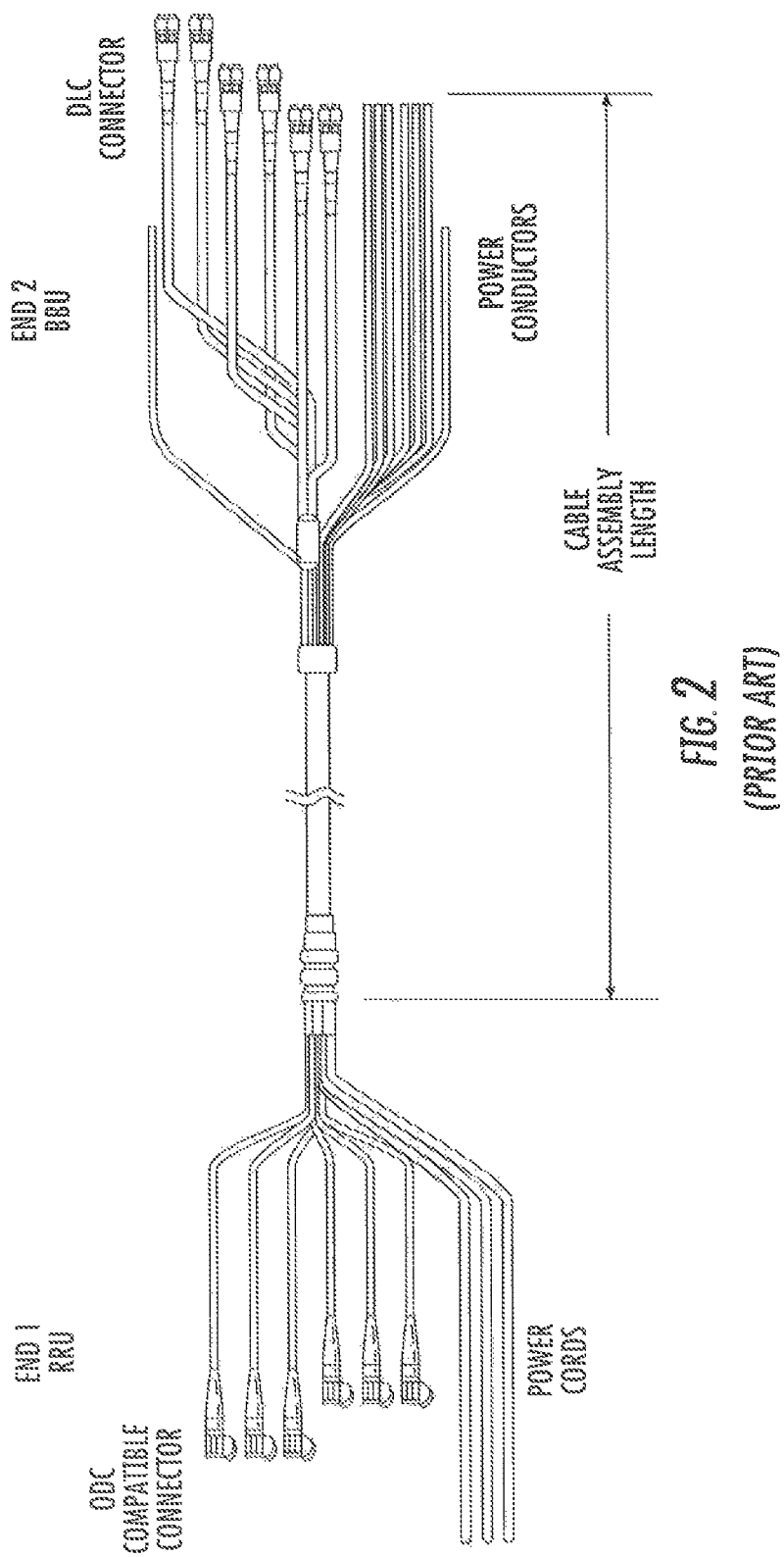
FIG. 2 is a diagrammatic representation showing more detail regarding the trunk cable used in FIG. 1.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIGS. 3-8, optical fiber trunk cable breakout canisters 50 and assemblies 10 in accordance with the present disclosure are provided. Canisters 50 in accordance with the present disclosure advantageously provide improved sealing with optical fibers trunk cables and subunits thereof, advantageously reducing the risk of liquid leakage into the canisters. Additionally, canisters 50 in accordance with the present disclosure advantageously provide features which reduce the risk of optical fibers trunk cables and subunits thereof being moved and dislodged relative to the canisters 50, thus reducing the risk of damage to the assemblies 10.

An assembly 10 includes an optical fiber trunk cable 20. The cable 20 includes an outer jacket 22 which surrounds portions of one or more subunits 24 of the cable 20. A subunit 24 may include one or more optical fibers or alternatively may include a power conductor, such as a copper wire. A subunit 24 may further include, various outer protective layers, such as cladding, buffer and/or jacket layers, which surround and protect the optical fibers (or power conductor). The subunits 24 included in an optical fiber trunk cable 20 may be only optical fiber subunits 24, only power conductor subunits, or a combination of optical fiber and power conductor subunits. A portion of the subunits 24 (along a longitudinal axis of the cable) may be surrounded by the outer jacket 22. Further, the outer jacket 22 may terminate, and portions of the subunits 24 may continue and thus extend from the outer jacket 22. These portions of the subunits 24 may thus be exposed as illustrated.

Breakout canister 50 may include a main canister body 52 which extends (i.e. along a longitudinal axis of the canister 50) between and defines a first end opening 54 and a second end opening 56. The first end opening 54 and second end opening 56 may in exemplary embodiments be generally circular. The first end opening 54 may have a maximum width (or diameter in the case of a generally circular opening) 55, and the second end opening 56 may have a maximum width (or diameter in the case of a generally circular opening) 57. The maximum width 55 in exemplary embodiments is less than the maximum width 57.

Main canister body 52 may further include a first end portion 62 and a second end portion 64. First end portion 62 may include and define the first end opening 54, and second end portion 64 may include and define the second end portion 56. In exemplary embodiments, the first end portion 62 and second end portion 64 may be generally cylindrical.

In exemplary embodiments as shown, the main canister body 52 may further include an intermediate portion 66 that is disposed between the first end portion 62 and the second end portion 64, such as along the longitudinal axis of the body 52. The intermediate portion 66 may be connected to the first end portion 62 and second end portion 64. In exemplar) embodiments, the intermediate portion 66 has a generally conical shape, and thus provides a transition between the first end portion 62 and second end portion 64. A first intermediate opening 58 may be defined at an intersection of the first end portion 62 and the intermediate portion 66, and a second intermediate opening may be defined at an intersection of the second end portion 64 and the intermediate portion 66. The first intermediate opening 58 may have a maximum width (or diameter in the case of a generally circular opening) 59.

The main canister body 52, such as the portions 62, 64, 66 thereof, may define a canister interior 68. The body 52 and portions 62, 64, 66 may be formed from any suitable material, such as a metal (such as aluminum) or plastic. In exemplary embodiments, the portions 62, 64, 66 may be integral, and thus formed together as a unitary component.

Second end portion 64 may, in some embodiments, include an internal stop 70. The internal stop 70 may, for example, be an internal shoulder of the second end portion 64, as shown. In exemplary embodiments, stop 70 is a generally annular component that extends around an entire internal periphery of the second end portion 64 or a portion thereof. Stop 70 may be disposed at a predetermined distance 71 from the second end opening 56.

Figure 3:
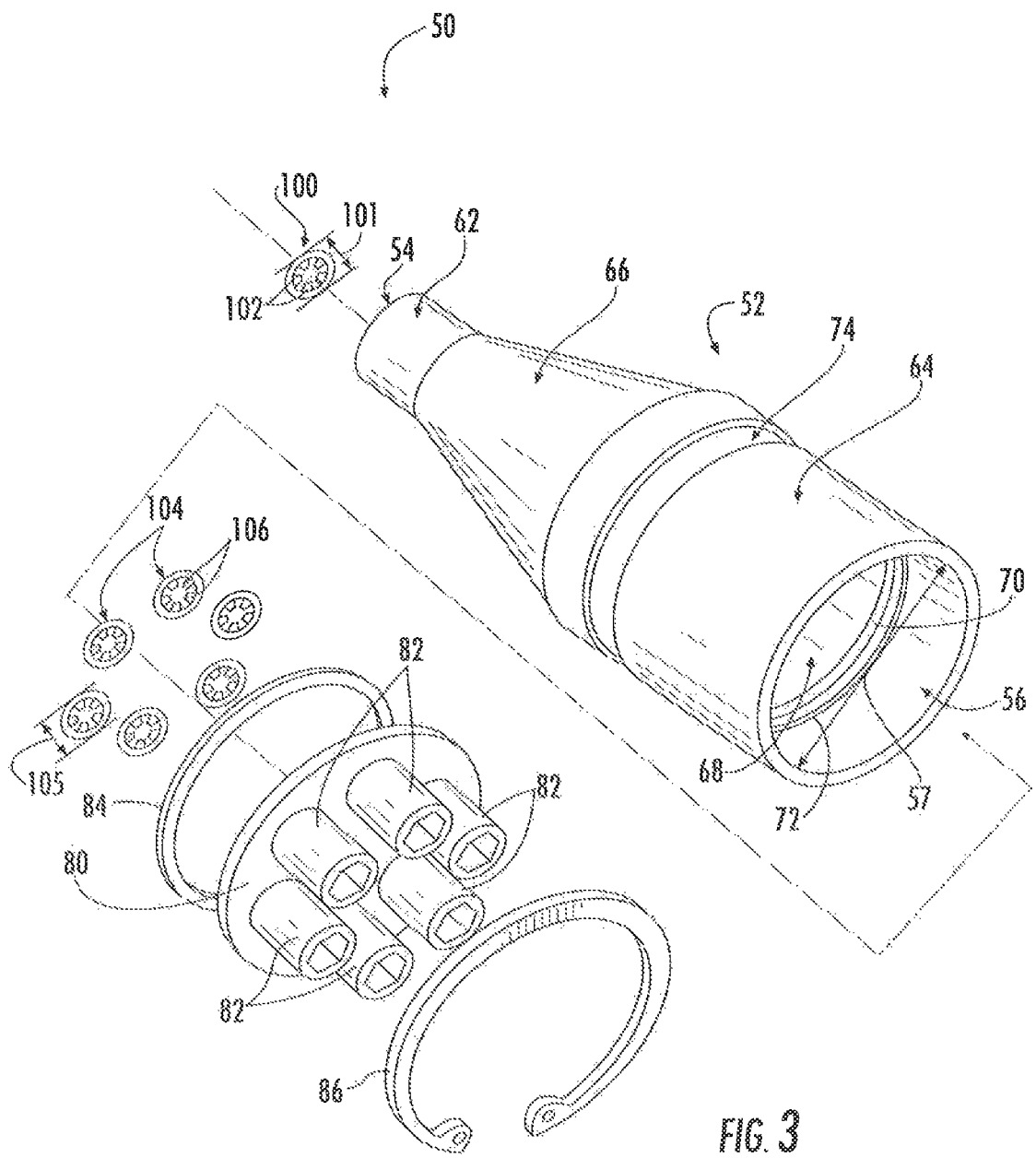
FIG. 3 is a perspective exploded view of a breakout canister in accordance with embodiments of the present disclosure.
Figure 4:
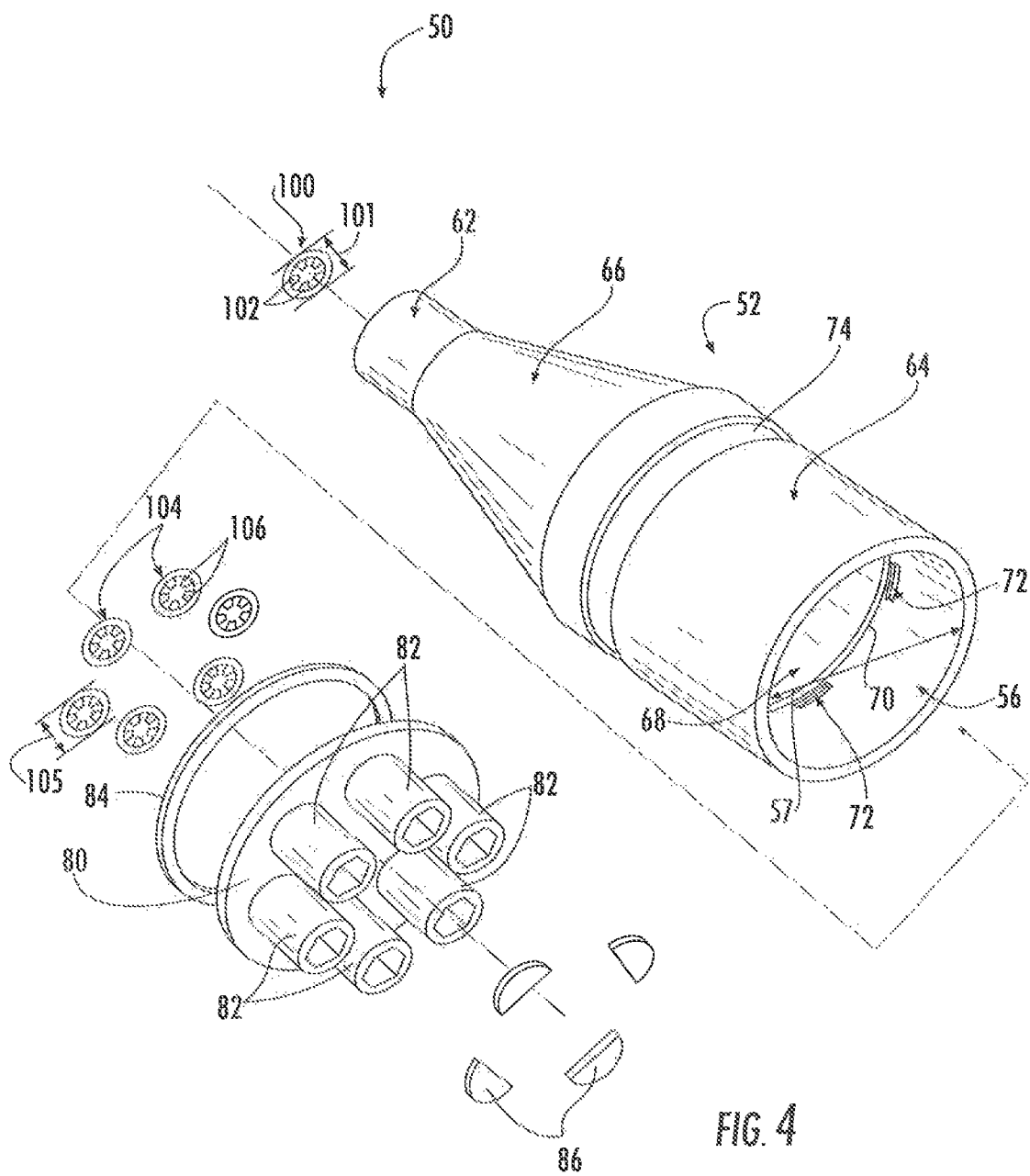
FIG. 4 is a perspective exploded view of a breakout canister in accordance with other embodiments of the present disclosure.

In some embodiments, one or more internal grooves 72 may be defined in the second end portion 64, such as within the interior 68. The grooves 72 may be spaced from the stop 70, such as towards to the second end opening 56. The grooves 72 may, for example, be defined in an internal surface of the second portion 64. In some embodiments, as illustrated in FIG. 3, a single annular groove 72 may extend around an entire internal periphery of the second end portion 64. In other embodiments, as illustrated in FIG. 4, a plurality of discrete annular grooves 72 may be disposed in an annular array about an internal periphery of the second end portion 64.

In some embodiments, one or more external grooves 74 may be defined in the second end portion 64. In exemplary embodiments as shown, a single annular groove 74 may extend around an entire external periphery of the second end portion 64. Such groove(s) 74 may be provided for attachment of mounting clamps, etc. to the main canister body 52.

First end portion 62 may, in some embodiments, include an internal stop 76. The internal stop 76 may, for example, be an internal shoulder of the first end portion 62, as shown. In exemplary embodiments, stop 76 is a generally annular component that extends that extends around an entire internal periphery of the first end portion 62 or a portion thereof. Stop 76 may be disposed at a predetermined distance 77 from the first end opening 54.

Figure 5:
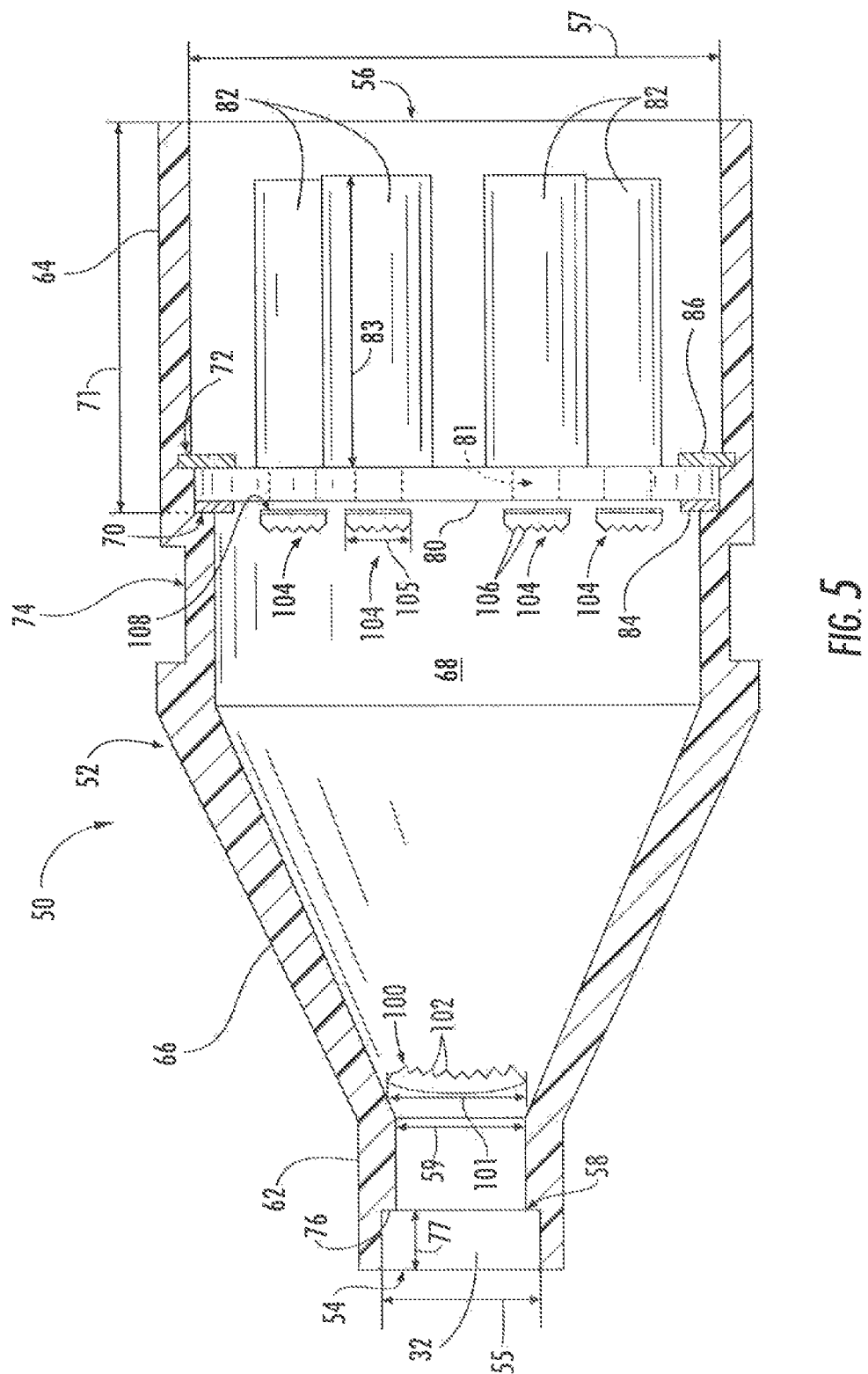
FIG. 5 is a cross-sectional view of a breakout canister in accordance with embodiments of the present disclosure.
Figure 6:
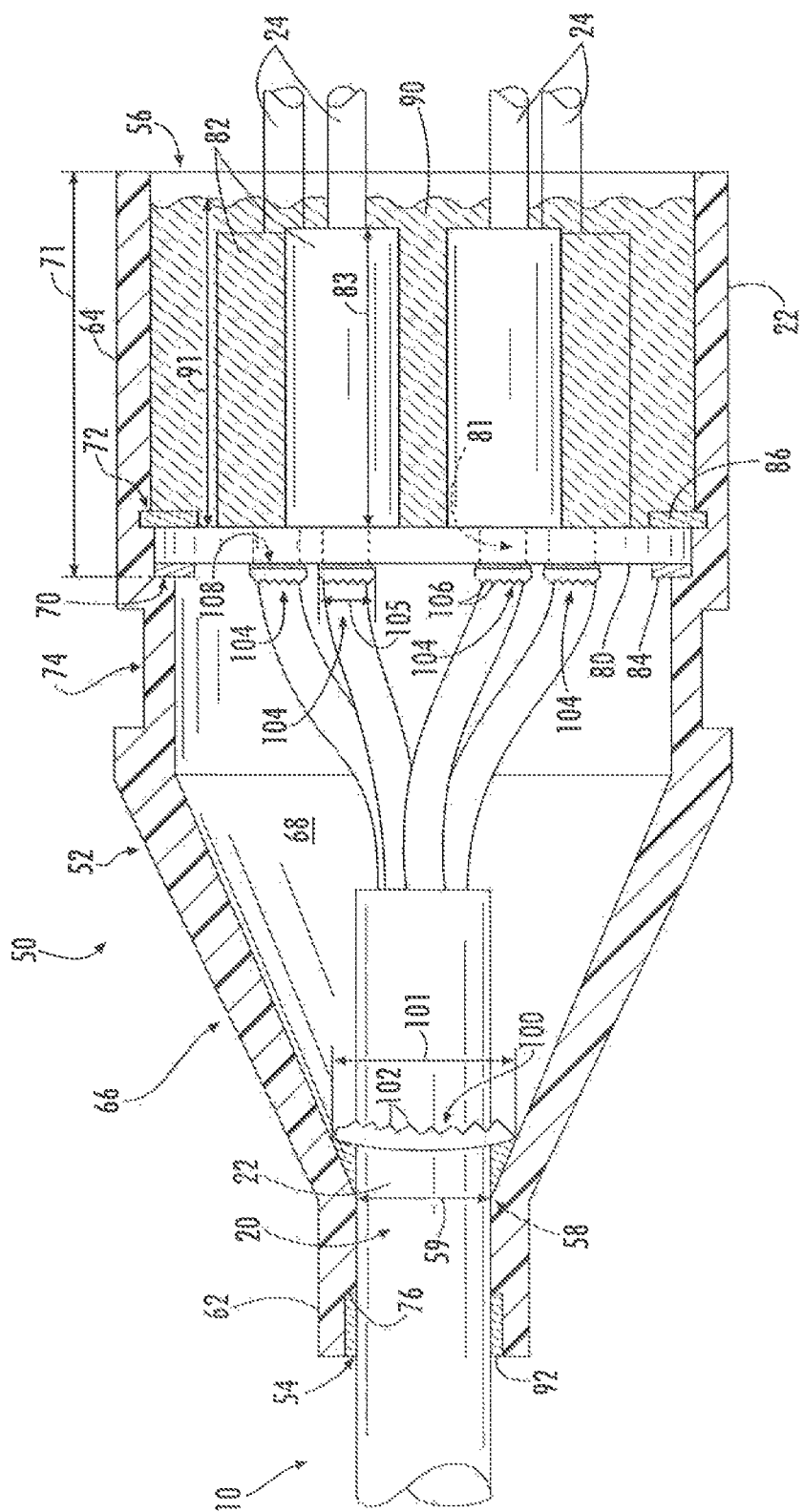
FIG. 6 is a cross-sectional view of a breakout assembly in accordance with embodiments of the present disclosure.
Figure 7:
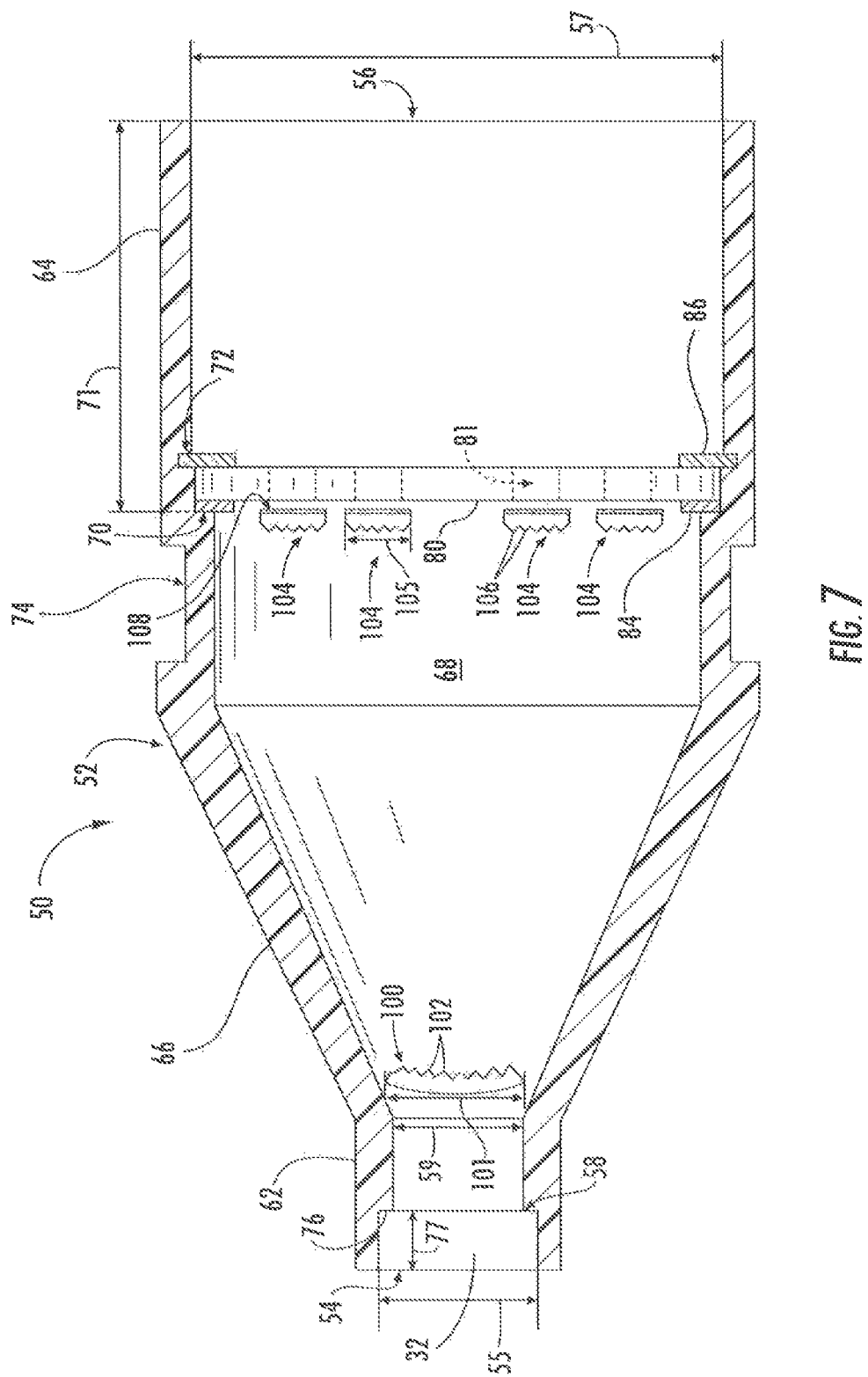
FIG. 7 is a cross-sectional view of a breakout canister in accordance with other embodiments of the present disclosure.
Figure 8:
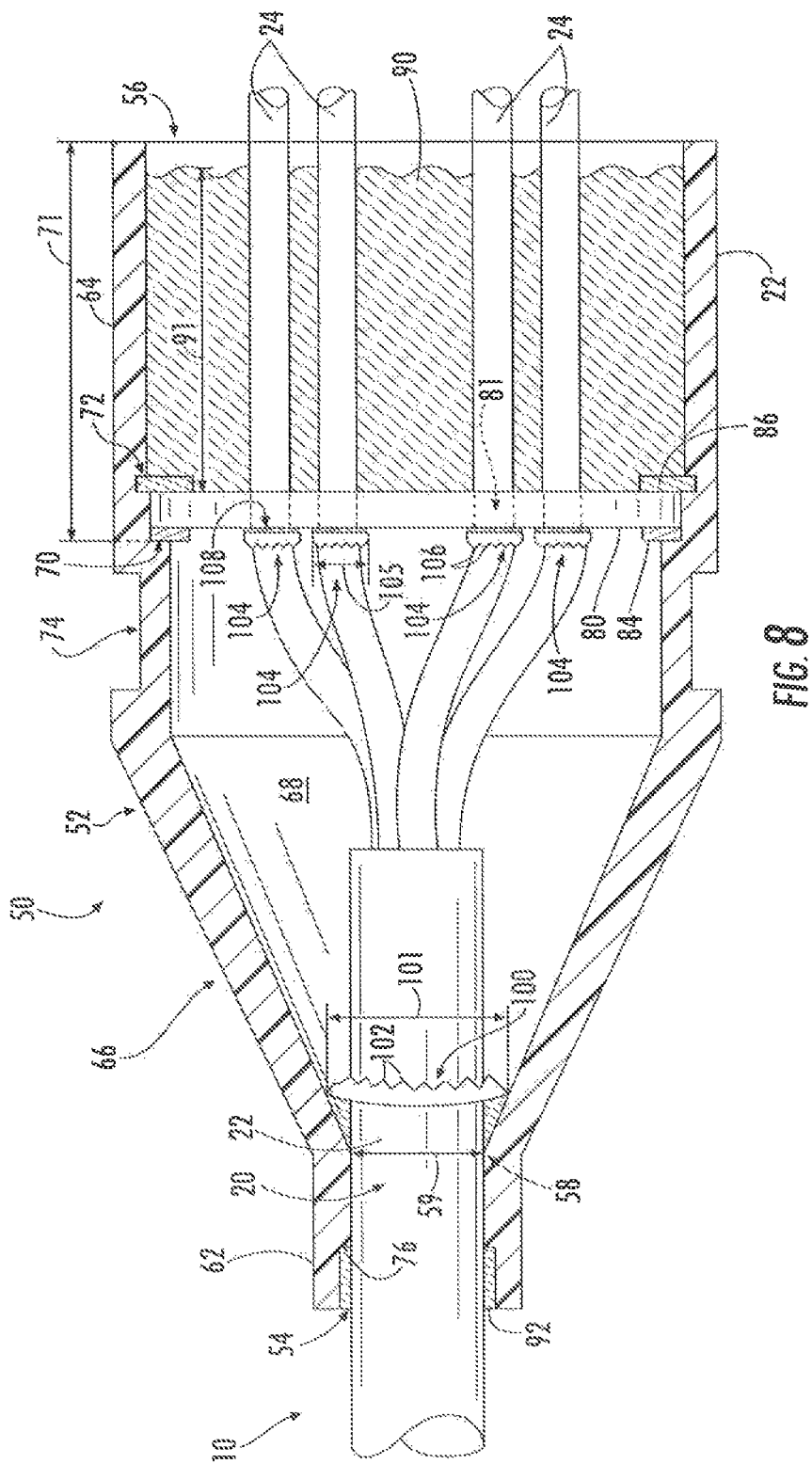
FIG. 8 is a cross-sectional view of a breakout assembly in accordance with other embodiments of the present disclosure.

Breakout canister 50 may further include a plate 80. The plate 80, which in exemplary embodiments have a generally circular shape, may be disposed within the second end portion 64. Apertures 81 may be defined in and through the plate 80, as shown. As discussed herein, a subunit 24 may extend through each aperture 81. Further, in some embodiments as illustrated in FIGS. 5 and 6, a plurality of nozzles 82 may extend from the plate 80 within the second end portion 64 and towards the second end opening 56. Each nozzle 82 may in exemplary embodiments be a generally tubular component aligned with an aperture 81 such that a subunit 24 may extend therethrough. FIGS. 7 and 8 illustrate embodiments wherein no nozzles 82 are utilized.

The plate 80 and optional nozzles 82 may be formed from any suitable material, such as a metal (such as aluminum) or plastic. In exemplary embodiments, when nozzles 82 are utilized, the plate 80 and nozzles 82 may be integral, and thus formed together as a unitary component.

As illustrated in FIGS. 5 through 8, the plate 80 may engage the stop 70 within the interior 68. This engagement may locate the plate 80 and optional nozzles 82 within the second end portion 64. In some embodiments, the plate 80 may directly contact the stop 70. Alternatively, a cushioning element 84, such as a bearing pad, may be provided and disposed between the plate 80 and the stop 70 to provide the engagement between the plate 80 and stop 70. The cushioning element 84 in exemplary embodiments may be generally ring-shaped. Cushioning element 84 may, for example, be formed from a rubber or other suitable flexible, resilient material.

Each nozzle 82 may have a height 83. In exemplary embodiments, the heights 83 may be less than the predetermined distance 71. Accordingly, in exemplary embodiments, the nozzles 82 may terminate within the interior 68 and below the second end opening 56.

As discussed, one or more internal grooves 72 may be provided within the second end portion 64. In exemplary embodiments, one or more retainer members 86 may be received partially within the groove(s) 72, and may extend from the grooves(s) 72 into the interior. The retainer members 86 may be inserted into the groove(s) 72 after the plate 80 is positioned in engagement with the stop 70 to secure and retain the plate 80 (and nozzles 82) within the second end portion 64.

In some embodiments, as illustrated in FIG. 3, a single retainer member 86 may be utilized. In these embodiments, the retainer member 86 may, for example, be a C-clip as shown. The retainer member 86 may be received partially within the groove 72 and extend from the groove 72 to contact and retain the plate 80. In other embodiments, as illustrated in FIG. 4, multiple retainer members 86 may be utilized. In these embodiments, the retainer members 86 may, for example, be retainer keys (which are generally planer, half-moon shaped disks). Each retainer member 86 may be received partially within a groove 72 and extend from the groove 72 to contact and retain the plate 80.

As illustrated in FIGS. 6 and 8, the cable 20 when assembled may generally extend through the canister 50. Specifically, the outer jacket 22 may enter the canister body 52 through the first end opening 54, and be received within the first end portion 62. The outer jacket 22 may further extend into and be received within the intermediate portion 66. In the interior 68, such as within the intermediate portion 66, the outer jacket 22 may terminate and the subunits 24 may extend therefrom. Each subunit 24 may extend through the second end portion 62 and exit the canister body 52 through the second end opening 56. Specifically, each subunit 24 may extend through the plate 80, i.e. through an aperture 81 thereof, and may in some embodiments further extend through one of the plurality of nozzles 82, as shown.

A potting material (such as a first potting material) 90 may be disposed within the second end portion 64. The potting material 90 may, as shown, surround a portion of each subunit 24 within the second end portion 64. Further, when nozzles 82 are utilized, the potting material 90 may surround each of the plurality of nozzles 82. The potting material 90 in exemplary embodiments may be an epoxy or urethane. Alternatively, other suitable potting materials 90 may be utilized. A height 91 of the potting material 90 may be greater than the height 83 of the nozzles 82, and may further in exemplary embodiments be less than the predetermined distance 71, such that the potting material terminates within the interior 68 and below the second end opening 56.

A second potting material 92 may be disposed within the first end portion 62, such as between the first end opening 54 and the stop 76. Further, in some embodiments, some potting material 92 may extend past the stop 76 and, for example, into the intermediate portion 66. The potting material 92 may be an epoxy or urethane or other suitable potting material 92, and in exemplary embodiments may be the same as the first potting material 90.

The potting materials 90, 92 may advantageously seal the assembly 10 generally, such as at the first end opening 54 and adjacent or at the second end opening 56. Accordingly, heat shrink material is not required. The potting material 90 may further, for example, stabilize the plate 80 and optional nozzles 82 within the interior 68 and the second end portion 64.

Referring again to FIGS. 3-8, in exemplary embodiments, a retainer washer (i.e. a first retainer washer) 100 may be disposed within the main canister body 52 (i.e. the interior 68). For example, the retainer washer 100 may be disposed within the intermediate portion 66. The retainer washer 100 may surround and engage the jacket 22 of the cable 20, as shown. For example, components of the retainer washer 100, such as inner teeth 102 thereof, may contact and embed into the jacket 22. In exemplary embodiments, the retainer washer 100 is an internal tooth lock washer, also known as a star lock washer, internal shake proof washer, or shaft retainer washer. Alternatively, other suitable retainer washers 100 may be utilized. The retainer washer 100 may in exemplary embodiments have a maximum outer width (or diameter) 101 that is greater than the maximum width 59 of the first intermediate opening 58.

The retainer washer 100 may advantageously increase the pulling force that can be applied to the cable 20 before the cable 20 separates from the canister 50 (and, for example, the second potting material 92 thereof). When the portion of the cable 20 that includes the outer jacket 22 is pulled away from the canister 50, the retainer washer 100 may advantageously brace against the inner sidewall of the body 52, such as of the intermediate portion 66), thus assisting to prevent such separation.

Further, in some embodiments, one or more second retainer washers 104 may be disposed within the main canister body 52 (i.e. the interior 68). For example, the retainer washer 104 may be disposed within the second end portion 64. The retainer washers 104 may, in some embodiments, be secured to the plate 80, such as via a suitable adhesive 108 (which may act as a sealant), for assembly and stability purposes. Each retainer washer 104 may surround and engage a subunit 24 of the cable 20, as shown. For example, components of the retainer washer 104, such as inner teeth 106 thereof, may contact and embed into the subunit 24. In exemplary embodiments, the retainer washer 104 is an internal tooth lock washer, also known as a star lock washer, internal shake proof washer, or shaft retainer washer. Alternatively, other suitable retainer washers 104 may be utilized. The second retainer washer 104 may in exemplary embodiments have a maximum outer width (or diameter) 105 that is less than the maximum outer width 101 of the first retainer washer 100.

The retainer washers 104 may advantageously increase the pulling force that can be applied to the subunits 24 before the subunits 24 separate from the canister 50 (and, for example, the first potting material 90 thereof). When individual subunits 24 are pulled away from the canister 50, the retainer washers 104 may advantageously brace against the plate 80 thus assisting to prevent such separation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An optical fiber trunk cable breakout canister, comprising:
    a main canister body, the main canister body extending between a first end opening and a second end opening and comprising a first end portion defining the first end opening and a second end portion defining the second end opening, the first end opening having a maximum width that is less than a maximum width of the second end opening;
    a plate disposed within the second end portion;
    a potting material disposed within the second end portion;
    a plurality of nozzles extending from the plate within the second end portion, wherein the potting material surrounds each of the plurality of nozzles; and
    a retainer washer disposed within the main canister body.

2. The breakout canister of claim 1, wherein the main canister body further comprises an intermediate portion disposed between the first end portion and the second end portion, wherein a first intermediate opening is defined between the first end portion and the intermediate portion, and wherein the retainer washer has a maximum outer width greater than a maximum width of the first intermediate opening.

3. The breakout canister of claim 1, wherein the retainer washer is an internal tooth lock washer.

4. The breakout canister of claim 1, wherein the retainer washer is a first retainer washer, and further comprising a second retainer washer disposed within the main canister body.

5. The breakout canister of claim 4, wherein the second retainer washer is disposed within the second end portion.

6. The breakout canister of claim 4, wherein the second retainer washer is a plurality of second retainer washers.

7. The breakout canister of claim 4, wherein a maximum outer width of the second retainer washer is less than a maximum outer width of the first retainer washer.

8. The breakout canister of claim 1, wherein the main canister body further comprises an intermediate portion disposed between the first end portion and the second end portion, the intermediate portion having a conical shape.

9. The breakout canister of claim 8, wherein the retainer washer is disposed within the intermediate portion.

10. The breakout canister of claim 1, wherein the second end portion includes an internal stop, the stop disposed at a predetermined distance from the second end opening, and wherein the plate engages the stop.

11. The breakout canister of claim 10, further comprising a plurality of nozzles extending from the plate within the second end portion, and wherein a height of each of the plurality of nozzles is less than the predetermined distance.

12. The breakout canister of claim 10, wherein a cushioning element is disposed between the plate and the stop.

13. The breakout canister of claim 1, wherein the second end portion defines an internal groove, and further comprising a retainer member received partially within the groove.

14. The breakout canister of claim 13, wherein the retainer member is a retainer key.

15. The breakout canister of claim 1, wherein the first end portion includes an internal stop.

16. The breakout canister of claim 1, further comprising a second potting material disposed within first end portion.

17. An optical fiber trunk cable breakout assembly, comprising:
    a trunk cable, the trunk cable comprising an outer jacket and a plurality of subunits extending from the outer jacket; and
    a breakout canister, comprising:
        a main canister body, the main canister body extending between a first end opening and a second end opening and comprising a first end portion defining the first end opening and a second end portion defining the second end opening, the first end opening having a maximum width that is less than a maximum width of the second end opening, wherein the jacket extends through the first end opening and each of the plurality of subunits extends through the second end opening;
        a plate disposed within the second end portion, wherein each of the plurality of subunits extends through the plate;
        a potting material disposed within the second end portion, the potting material surrounding a portion of each of the plurality of subunits;
        a plurality of nozzles extending from the plate within the second end portion, wherein the potting material surrounds each of the plurality of nozzles; and
        a retainer washer disposed within the main canister body, the retainer washer surrounding and engaging the jacket.

18. The breakout assembly of claim 17, wherein the main canister body further comprises an intermediate portion disposed between the first end portion and the second end portion, wherein a first intermediate opening is defined between the first end portion and the intermediate portion, and wherein the retainer washer has a maximum outer width greater than a maximum width of the first intermediate opening.

19. The breakout assembly of claim 17, wherein the retainer washer is an internal tooth lock washer.

20. The breakout assembly of claim 17, wherein the retainer washer is a first retainer washer, and further comprising a second retainer washer disposed within main canister body, the second retainer washer surrounding and engaging one of the plurality of subunits.

* * * * *